United States Patent [19]

Tomita

[11] Patent Number: 5,745,073
[45] Date of Patent: Apr. 28, 1998

[54] DISPLAY APPARATUS FOR FLIGHT CONTROL

[75] Inventor: Atsushi Tomita, Tokyo, Japan

[73] Assignee: Mitsubishi Denki Kabushiki Kaisha, Tokyo, Japan

[21] Appl. No.: 582,506

[22] Filed: Jan. 3, 1996

[30] Foreign Application Priority Data

Jan. 31, 1995 [JP] Japan ................... 7-014766

[51] Int. Cl.$^6$ ............................ G01S 7/22; G01S 13/91
[52] U.S. Cl. ............................... 342/179; 342/176
[58] Field of Search ........................ 342/176, 179, 342/185

[56] References Cited

U.S. PATENT DOCUMENTS

| | | | |
|---|---|---|---|
| 4,307,396 | 12/1981 | Slater | 342/182 |
| 5,111,400 | 5/1992 | Yoder | 364/424.01 |
| 5,117,360 | 5/1992 | Hotz et al. | 364/423 |
| 5,276,798 | 1/1994 | Peaslee et al. | 395/162 |
| 5,374,932 | 12/1994 | Wyschogrod et al. | 342/36 |
| 5,434,571 | 7/1995 | Erie | 342/169 |

FOREIGN PATENT DOCUMENTS

3220486  9/1991  Japan .

*Primary Examiner*—Ian J. Lobo
*Attorney, Agent, or Firm*—Rothwell, Figg, Ernst & Kurz

[57] ABSTRACT

A display apparatus for flight control comprises a digital scan converter which converts ASDE video signal into a radar display by a television scan video, a CPU portion which receives a radar target position via LAN and generates a computer graphic display by adding an operation information from operation panel, a picture synthesizing portion which superposes computer graphic display from CPU portion on a radar display, and CRTs which display a picture synthesized at synthesizing portion. ASDE radar signal is converted to television scan video signal via the digital scan converter. The computer graphic display is generated by adding an operation information to the target information such as an airplane at CPU portion. A radar display and a computer graphic display are synthesized at the picture synthesizing portion. Thereby various information necessary for flight control is displayed on CRT.

10 Claims, 8 Drawing Sheets

DISPLAY APPARATUS FOR FLIGHT CONTROL

BACKGROUND OF THE INVENTION

1. Field of the Invention

The present invention relates to a display apparatus for flight control, and in particular, relates to a multi-function display system for superposing other picture information on computer graphic pictures on a radar display apparatus.

2. Description of the Prior Art

Radar display has mainly been used as a display for flight control, and the radar display apparatus which superposes various kinds of information on a display for flight control in order to upgrade its function has been also used.

For example, Japanese laid-open Utility Model Publication No. 5-17582 discloses a construction which indicates a symbol of a target on a radar screen and Japanese laid-open Patent Publication No. 3-191891 discloses a construction which synthesizes several radar screens.

A display apparatus for monitoring an airport traffic called ARTS (Automated Radar Terminal System) specifically needs a multi-function display since it is necessary to digitalize two-dimensional radar signals and process it by a computer to display flight name, velocity and speed of airplanes.

Figure 8:
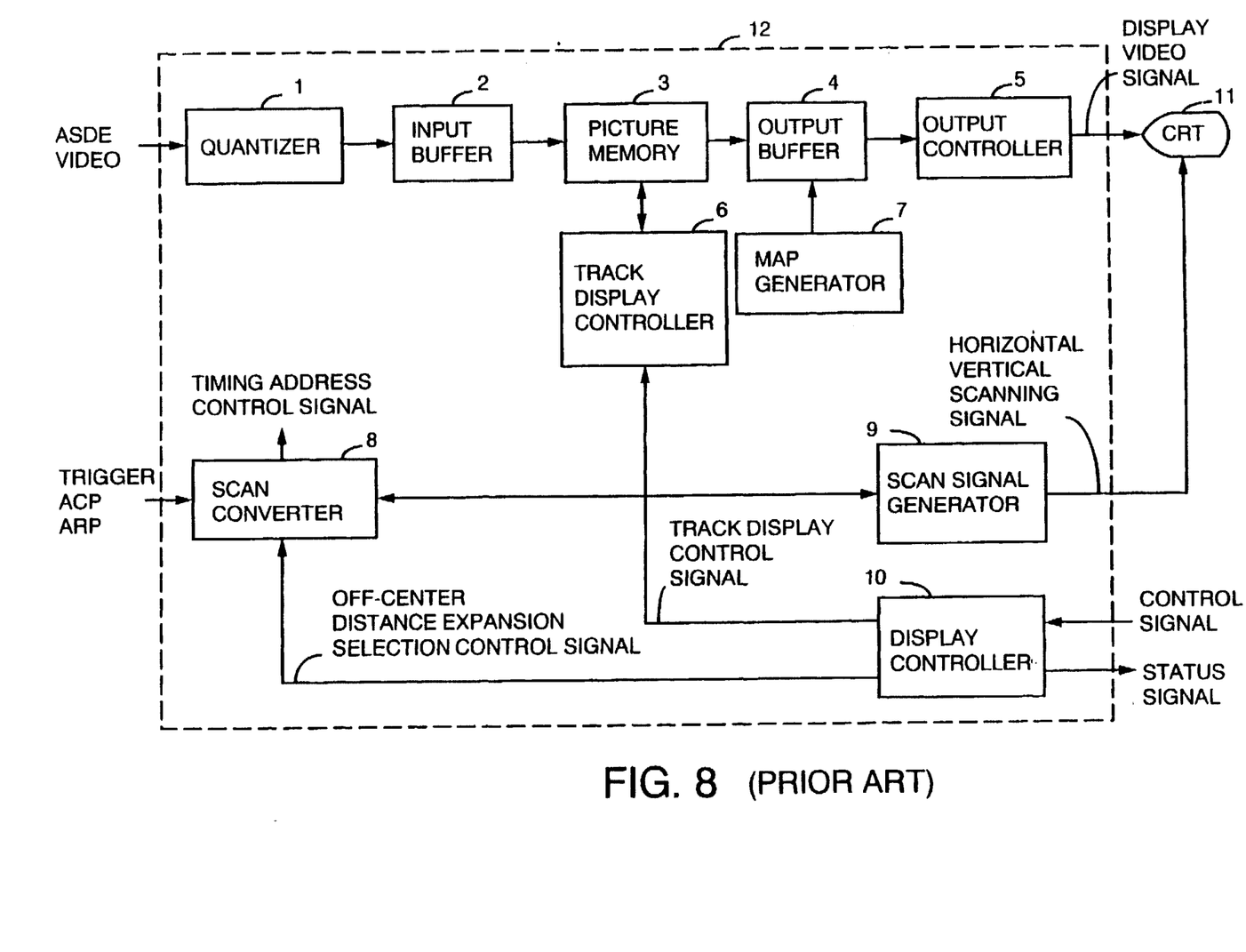
FIG. 8 is a block diagram of a conventional display apparatus for flight control.

FIG. 8 is a block diagram showing a conventional display apparatus for flight control, for example, disclosed in the "Radar Technique" (published by Electronic Information Communication Society in Japan, 1987, pages 203–208, written by Takashi Yoshida). Especially, FIG. 8 relates to a digital scan converter. In FIG. 8, a digital scan converter 12 comprises a quantizer 1, an input buffer 2, a picture memory 3, an output buffer 4, an output controller 5, a track display controller 6, a map generator 7, a scan converter 8; a scan signal generator 9 and a display controller 10. The quantizer 1 A/D converts a radar video signal received from Airport Surface Detection Equipment (ASDE, not shown). The input buffer 2 stores video signals digitalized in the quantizer 1. The picture memory 3 stores tracks of a current scan and the previous scan. The output buffer 4 synthesizes video signals and a map such as an airport geographic outline. The output controller 5 converts an output of the output buffer 4 into a display video signal for displaying it on CRT 11. The track display controller 6 processes data dropped out from the input buffer 2. The map generator 7 generates a map such as an airport geographic outline. The scan converter 8 converts a radar angle signal or a trigger signal such as ACP (Azimuth Count Pulse) and ARP (Azimuth Reference Pulse) into a television coordinate signal to generate a timing signal and an address control signal. The scan signal generator 9 generates a vertical and horizontal scanning signal for CRT 11 upon receiving a signal from the scan converter 8. The display controller 10 generates a status signal, an off-center distance expansion selection control signal and a track display control signal in order to control man machine information after receiving an input of control signal.

The operation of the above construction is explained below. A radar video signal from ASDE is converted to a digital signal by the quantizer 1 at a predetermined sampling rate. A digitally converted radar video signal for each sweep is stored in the input buffer 2. The data stored in the input buffer 2 is sequentially written at a predetermined address of picture memory 3 according to a television coordinate supplied by the scan converter 8.

On the other hand, during the reading process from the picture memory 3, data for one scan line is read out from the picture memory 3 and the data is stored in the output buffer 4. A map information from the map generator 7 such as an airport geographic outline is superposed on the output buffer 4.

The data from the output buffer 4 is transmitted to the output controller 5 according to an address of horizontal scanning. The output controller 5 receives the output signal from the output buffer 4 and then D/A converts it in order to output it to CRT 11 as a display video signal used for a television scan.

The track display controller 6 uses data which have been written in the picture memory 3 before and during the previous scanning by decreasing the data by a certain quantity to rewrite it again in the picture memory 3 so that the data are used as a track display in case there is no target data received from the input buffer 2.

The CRT 11 operates upon receiving a horizontal and a vertical scan signal respectively from the scan converter 8 and the scan signal generator 9. The display controller 10 controls a display of man machine information based on the control signal.

As described above, the conventional display apparatus for flight control converts a radar video signal into a display video signal to superpose it on a track and a map. Therefore, it is possible to display a television scan display of a radar video signal covering mainly an airport surface, but it does not have such functions as displaying other picture information or superposing computer graphics. Therefore, it has a disadvantage of low visibility when a computer display is confirmed as well as a radar display under flight control system using a computer.

It is an object of the present invention to provide a display apparatus for the flight control which solves the problems related to the conventional problems and increases efficiency and safety of flight control by superposing display such as a computer graphic display on a television scan display of a radar video signal.

It is another object of the present invention to provide a display apparatus for the flight control which greatly improves a display function of the flight control display terminal and has good visibility, good operationability and high security of the flight control by superposing the radar display on a window of a computer graphic.

It is another object of the present invention to provide a display apparatus for the flight control having a simplified apparatus construction since more multi-function of display is achieved by simply overlaying a radar display containing a target information generated by a general-purpose work station on a computer graphic display.

It is a further object of the present invention to provide a display apparatus for the flight control having more multi and many kinds of functions of flight control since information necessary for flight control is shared via a LAN (Local Area Network) and the computer graphic display is also received from the LAN, which enables the various information, as well as a radar display, necessary for flight control to be displayed on a display.

It is a further object of the present invention to provide a display apparatus for the flight control having effective information since computer graphic information for flight control is displayed via a general-purpose work station connected to LAN and the computer graphic information for flight control can be monitored from end terminals connected to LAN at various facilities of the airport.

It is a still further object of the present invention to provide a display apparatus for the flight control having simple flight control operation since a flight schedule drawn up by the flight information schedule processing system is displayed together with the radar display on the same display and the approval and change for the flight schedule is inputted from flight control display terminal.

SUMMARY OF THE INVENTION

According to one aspect of the invention, a display apparatus for flight control comprises a scan conversion means for generating a television scan video signal according to a radar signal; a computer graphic means for receiving a radar target position via LAN and for generating a computer graphic display by adding an operation information from an operation means to the radar target; a display synthesizing means which superposes a computer graphic display on said television scan video signal; a display means which displays a picture from said picture synthesizing means.

According to another aspect of the invention, a display apparatus for flight control preferably comprises a work station for a computer graphic means wherein a radar video signal from ASDE, an ACP signal, an ARP signal and a trigger signal and so on are processed at the digital scan converter, while a radar target and location information are processed at a work station, then the picture from a digital scan converter and a picture from the work station are synthesized at the picture synthesizing portion.

According to another aspect of the invention, a display apparatus for flight control preferably comprises control means, wherein said control means synthesizes a television scan radar video signal from ASDE display controller with graphic display information signal received from the airport weather doppler radar processors, terminal radar data information processing systems and flight control display terminals and so on.

According to another aspect of the invention, a display apparatus for flight control preferably comprises work stations which are connected to said LAN to get various graphic display information signals received from the airport weather doppler radar processors, terminal radar data information processing systems and flight control display terminals and so on.

According to another aspect of the invention, a display apparatus for flight control preferably incorporates information of the flight information schedule processing system into said LAN via other lines and displayed on said display means via the control means.

DETAILED DESCRIPTION OF THE PREFERRED EMBODIMENTS

Embodiment 1.

Figure 1:
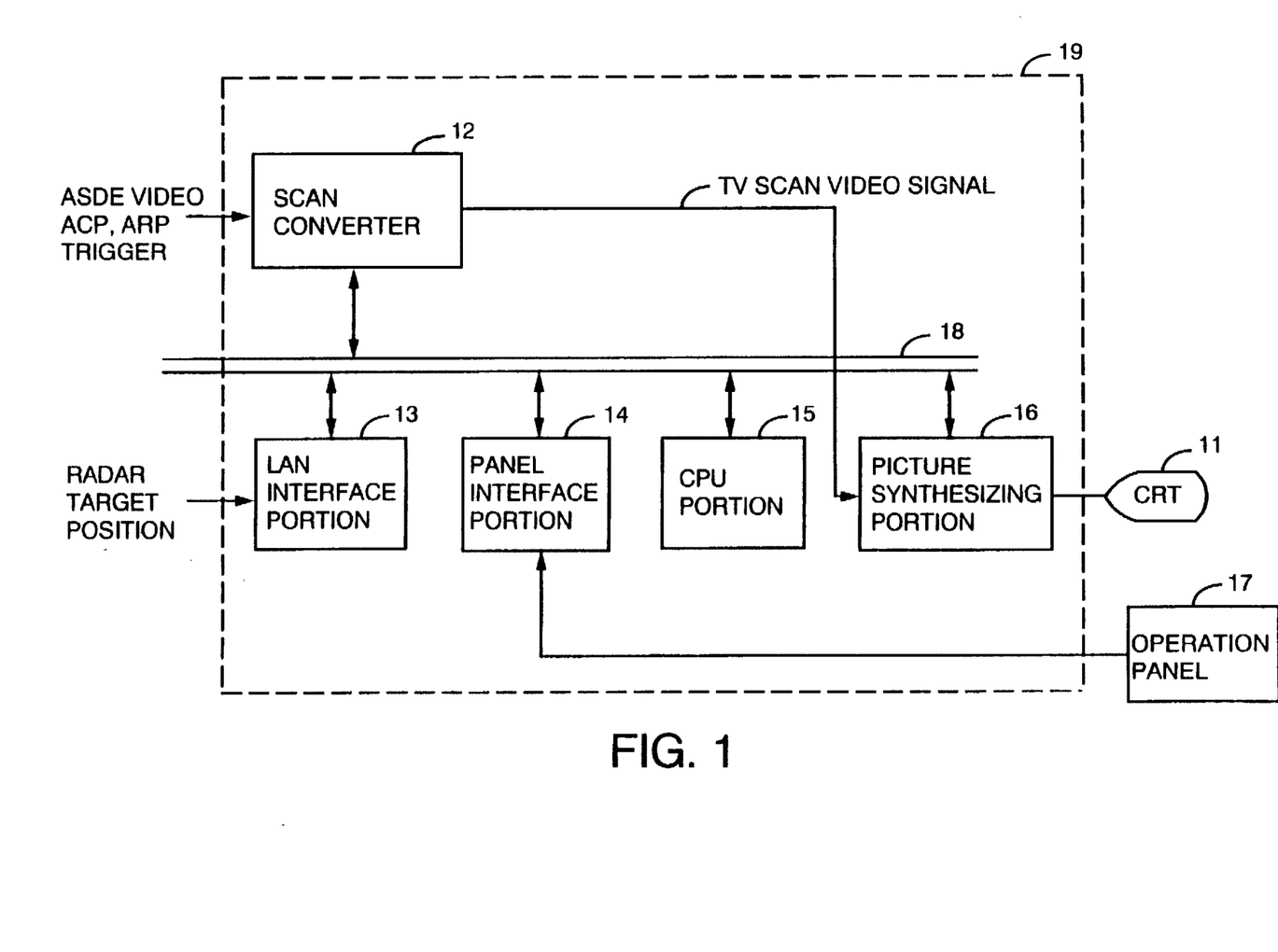
FIG. 1 shows a block diagram showing a flight control display apparatus of a first embodiment of the present invention.

FIG. 1 is a block diagram showing a display apparatus for flight control of an embodiment of the present invention. The display apparatus for flight control comprises a LAN (Local Area Network) interface portion 13 which interfaces target location information based on ASDE radar echo transmitted via LAN from an airport surface traffic control system to a bus 18, a panel interface portion 14 which interfaces the operation information inputted to the operation panel 17 by an operator to the bus 18. The display apparatus for flight control also comprises CPU portion 15 which carries out an overall control and generates an airplane symbol by computer graphic, a picture synthesizing portion 16 which superposes a television scan video signal from a digital scan converter 12 on a computer graphic display controlled by CPU portion 15 and displays the superposed picture on CRT 11. The digital scan converter 12 has basically the same construction as that in FIG. 8 which inputs a radar video signal, an ACP signal, an ARP signal and a trigger signal from a radar apparatus (not illustrated) and outputs a television scan video signal.

An operation of the above embodiment is explained below. The digital scan converter 12 generates a television scan video signal according to the radar video signal from ASDE, ACP signal, ARP signal, and the trigger signal and gives the television scan video signal to the picture synthesizing portion 16.

On the other hand, a target location of an airplane detected by the airport surface traffic control system is inputted into LAN interface portion 13 via LAN. The LAN interface portion 13 carries out a data transmission between the CPU portion 15 via bus 18 using a common input/output line and therefore the target location of the airplane which is inputted to the LAN interface portion 13 is transmitted to the CPU portion 15.

Figure 2:
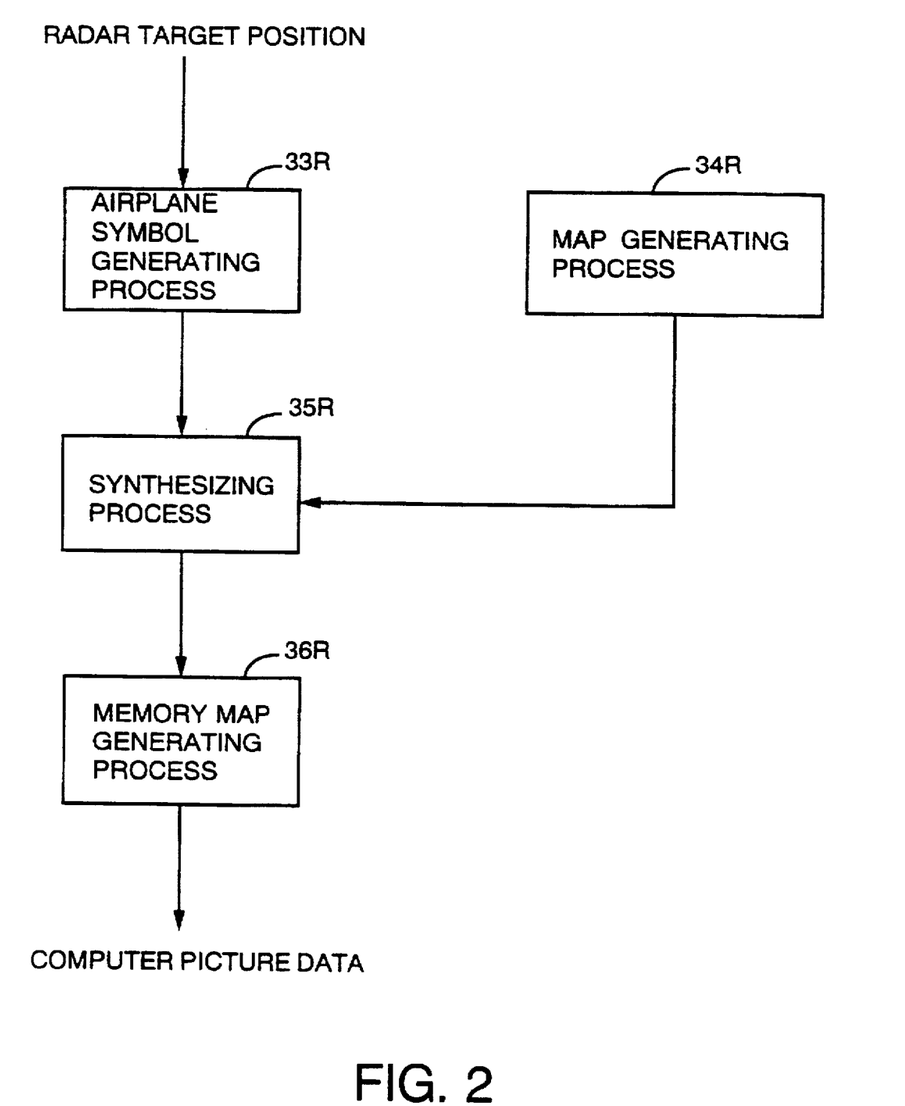
FIG. 2 shows a flow chart of process flow in the construction of FIG. 1.

As shown in the flow chart of FIG. 2, the CPU portion 15 processes an airplane symbol according to the radar target location in process 33R and generates a map in process 34R. The airplane symbol and the map obtained in the airplane symbol generating process 33R and the map generating process 34R are synthesized in process 35R. The synthesized symbol and map are converted into a computer picture data by a memory map generating process in process 36R.

Since the radar target location changes at every radar scan, it is symbolized by the airplane symbol generating process 33R. On the other hand, since a map of an airport building and a runway do not change at every radar scan, it is stored in the memory in advance in the map generating process 34R and the airplane symbol is superposed on the map to obtain computer picture data. The computer picture data are stored in the memory map in the memory map generating process 36R and transmitted to a picture synthesizing portion 16 according to sequential reading address via bus 18.

The picture synthesizing portion 16 expands the computer graphic picture data transmitted via the bus 18 and the television scan video signal transmitted from the digital scan converter 12 into the buffer memory corresponding to a raster display of CRT 11 and then outputs it to the CRT 11 as a chrominance signal of three primary colors.

An operation panel 17 carries out operations such as opening and closing, moving, enlargement and reduction of computer graphic windows to be displayed. A signal from the operation panel 17 is converted into a command signal by the panel interface portion 14 and inputted into the CPU portion 15 via the bus 18.

The CPU portion 15 generates a computer graphic symbol and so on according to a signal from the operation panel 17. The operation data is also transmitted to the digital scan converter 12 via the bus 18 and the television scan video signal is also enlarged or made smaller.

As described above, the apparatus of the present embodiment synchronizes the symbol display generated by computer graphic and the television scan video display at the picture synthesizing portion 16 and displays or changes it by the same operation system connected to the operation panel 17. Therefore, more multi-functions for flight control may be possible to be displayed.

Also, an integrated display for flight control information can be possible by combining target location information from another radar in addition to target location information from the specified radar which are transmitted via LAN. Furthermore, a systematic flight control can be achieved by sharing target location information and so on among a plurality of display terminals by operating several ASDE display controller 19 via LAN.

A target location information transmitted via LAN can be made common by connecting several digital scan converters 12 corresponding to several radars to several picture synthesizing portions 16 and CRTs 11 which correspond to the digital scan converters 12 and then by connecting these picture synthesizing portions 16 and CRTs 11 to the bus 18 of the ASDE display controller 19.

Figure 3:
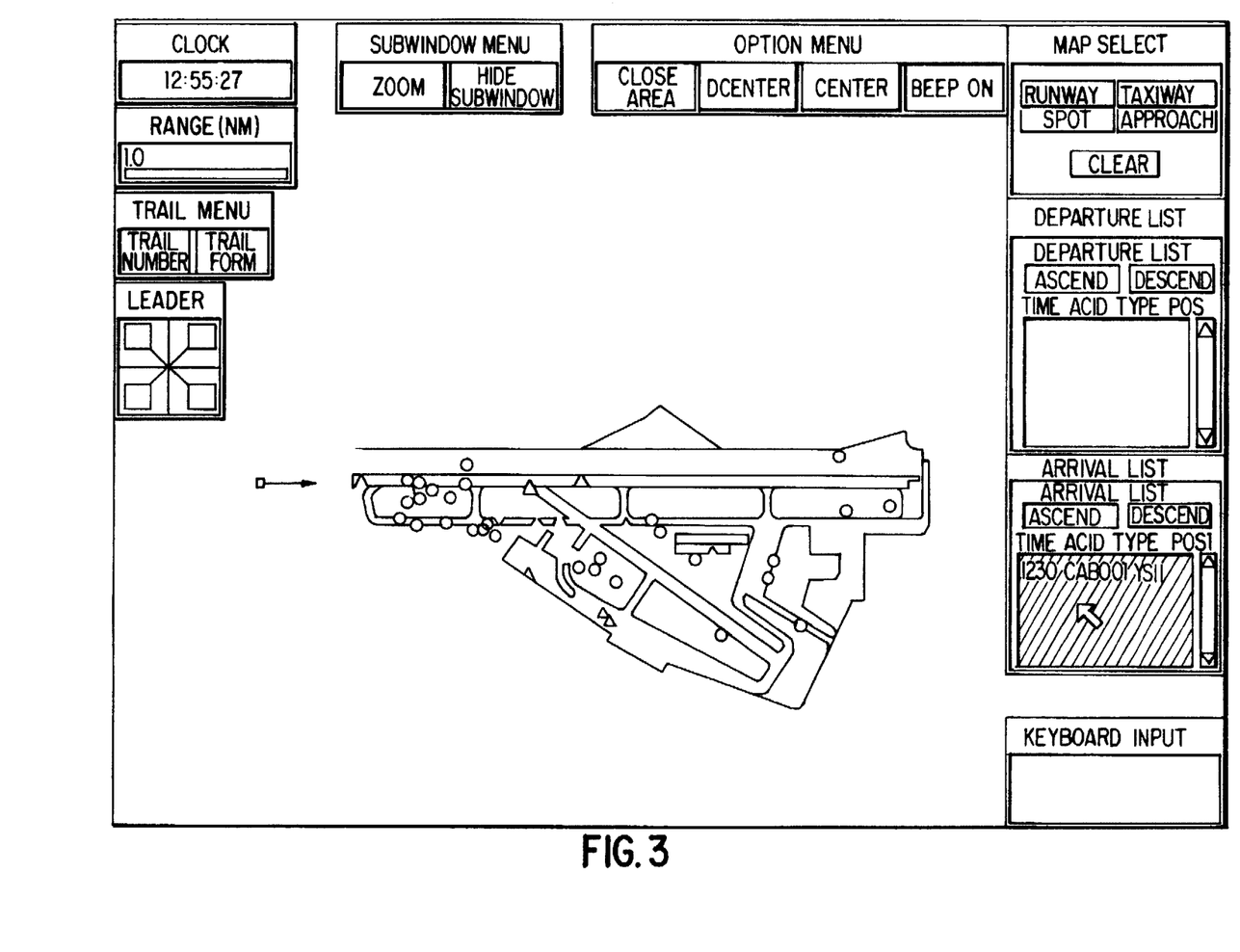
FIG. 3 shows an example of display in the construction of FIG. 1.

FIG. 3 is a display example on the CRT 11 which is obtained from the procedures described above. In FIG. 3, it is easily understood that the airplane locations are superposed on the airport geography. For example, as seen in the display, the operator easily knows that the airplane YS 11 has just arrived and stays at the near center of the sub-runway.

Embodiment 2.

Figure 4:
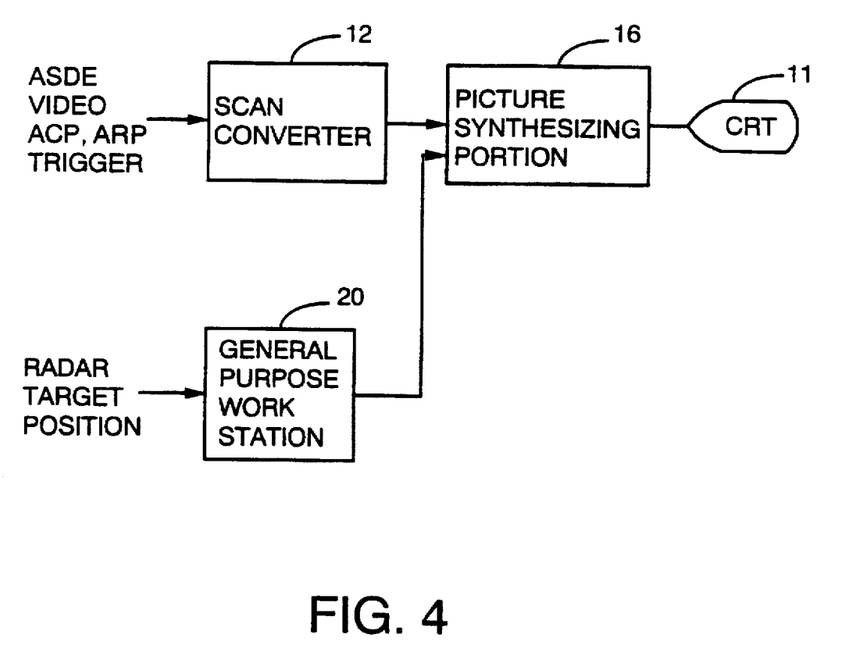
FIG. 4 shows a block diagram showing a flight control display apparatus of a second embodiment of the present invention.

FIG. 4 is a block diagram of a display apparatus for flight control in a second embodiment of the present invention. As shown in FIG. 4, the radar video signal from ASDE, the ACP signal, the ARP signal and the trigger signal are supplied to the digital scan converter 12. On the other hand, a radar target and a location information are supplied to a general-purpose work station 20. A picture from the digital scan converter 12 and a picture from the general purpose work station 20 are synthesized at picture synthesizing portion 16 and displayed at CRT 11.

An operation of the above embodiment is now explained. A radar video signal from ASDE is supplied to a picture synthesizing portion 16 as a radar display signal of television scan video signal via the digital scan converter 12.

On the other hand, a radar target location information is supplied to the general purpose work station 20. Since the general purpose work station 20 has a panel interface portion connected to the LAN interface and the operation system, it generates a computer graphic display screen according to a radar target location information and operation information.

A computer graphic display generated here can be multi-window display and can also be enlarged or reduced.

As described above, a television scan video signal from the digital scan converter 12 and a computer graphic display signal from the general purpose work station 20 are supplied to a picture synthesizing portion 16 in asynchronous state.

An picture synthesizing portion 16 overlays a computer graphic display on a television scan radar video display to generate a display signal and transmitted it to CRT 11. As a result, a radar display and a computer graphic display are displayed on CRT 11 at the same time which carries out a multi-function display for flight control.

Embodiment 3.

Figure 5:
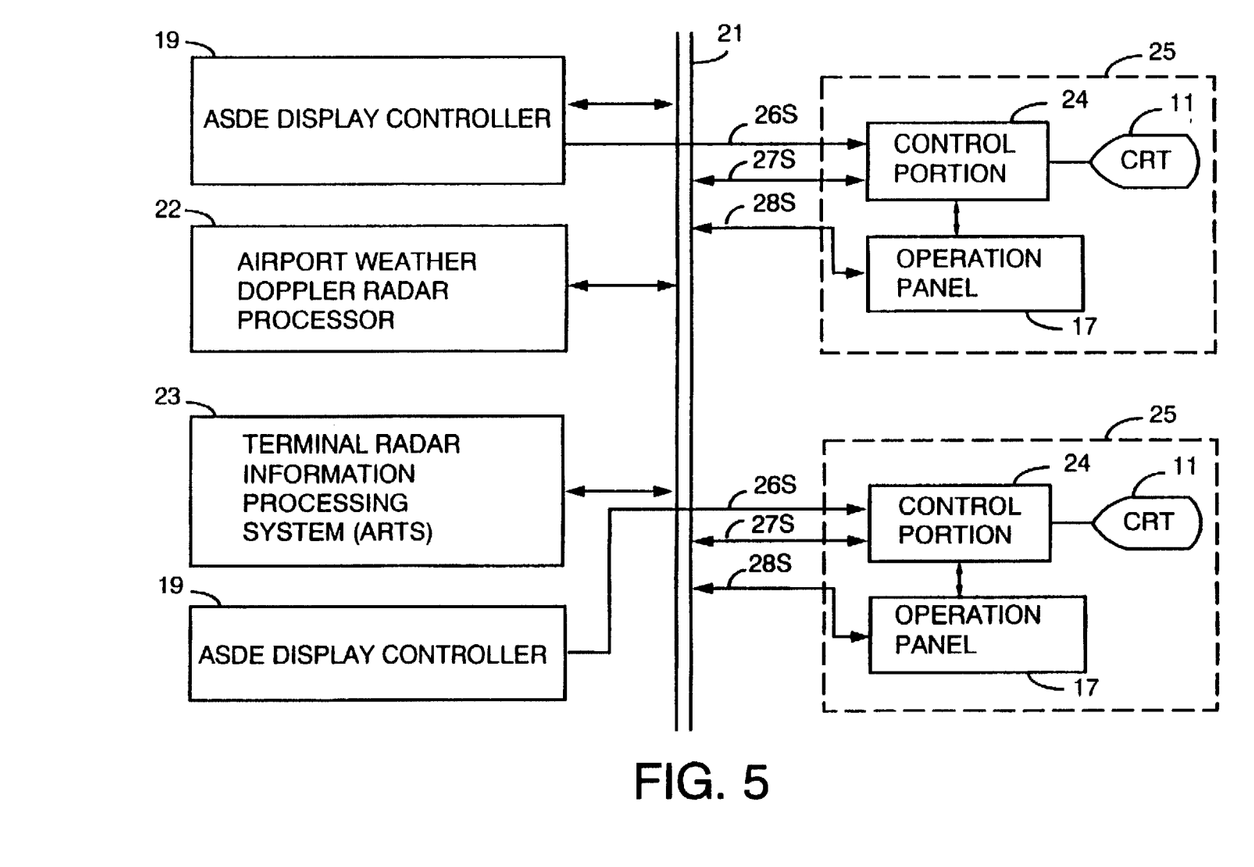
FIG. 5 is a block diagram showing a flight control display apparatus of a third embodiment of the present invention.

FIG. 5 is a block diagram of a display apparatus for flight control in a third embodiment of the present invention. As shown in FIG. 5, an ASDE display controller 19, an airport weather doppler radar processor 22, a terminal radar data information processing system 23 and a flight control display terminal 25 are connected to LAN 21. The flight control display terminal 25 comprises a control portion 24 which controls transmission and reception of the graphic display information signal 27S between LAN 21 and the display terminal 25. On the other hand, the control portion 24 is connected to an ASDE display controller 19 to receive a television scan radar video signal 26S from ASDE display controller 19. The operation panel 17 is also connected to LAN 21 to receive and transmit an operation control signal 28S. Flight control display information is displayed on CRT 11 at a flight control display terminal 25.

LAN 21 is provided in a control tower and airport facility in an airport. Communication protocol in the LAN 21 is commonly defined.

ASDE display controller 19 generates a display synthesized by a radar display and a computer graphic display. On the other hand, doppler information is provided by an airport weather doppler radar processor 22, while take-off and landing information of the terminal control is provided from a terminal radar data information processing system 23. Since the entire information is supplied to LAN 21, it can be provided to every flight control display terminal 25.

The flight control display terminal 25 receives a television scan radar video signal 26S from the corresponding ASDE display controller 19 as well as various kinds of information from LAN 21 as a graphic display information signal 27S to synthesize operation information from operation panel 17 at the control portion 24 and to display it on CRT 11 as multi-windows information.

As a result, the flight control display terminal 25 displays totally different kinds of information which is necessary for flight control via LAN 21. Therefore, it is possible to increase safety and accuracy of flight control.

By sharing an operation control signal 28S received from the operation panel 17 via LAN 21, it is possible to transmit and receive operation information between display terminals 25 and to request the operation to ASDE display controller 19, airport weather doppler radar processor 22 and terminal radar data information processing system 23 and also to carry out parameter setting by on-line operation.

Embodiment 4.

Figure 6:
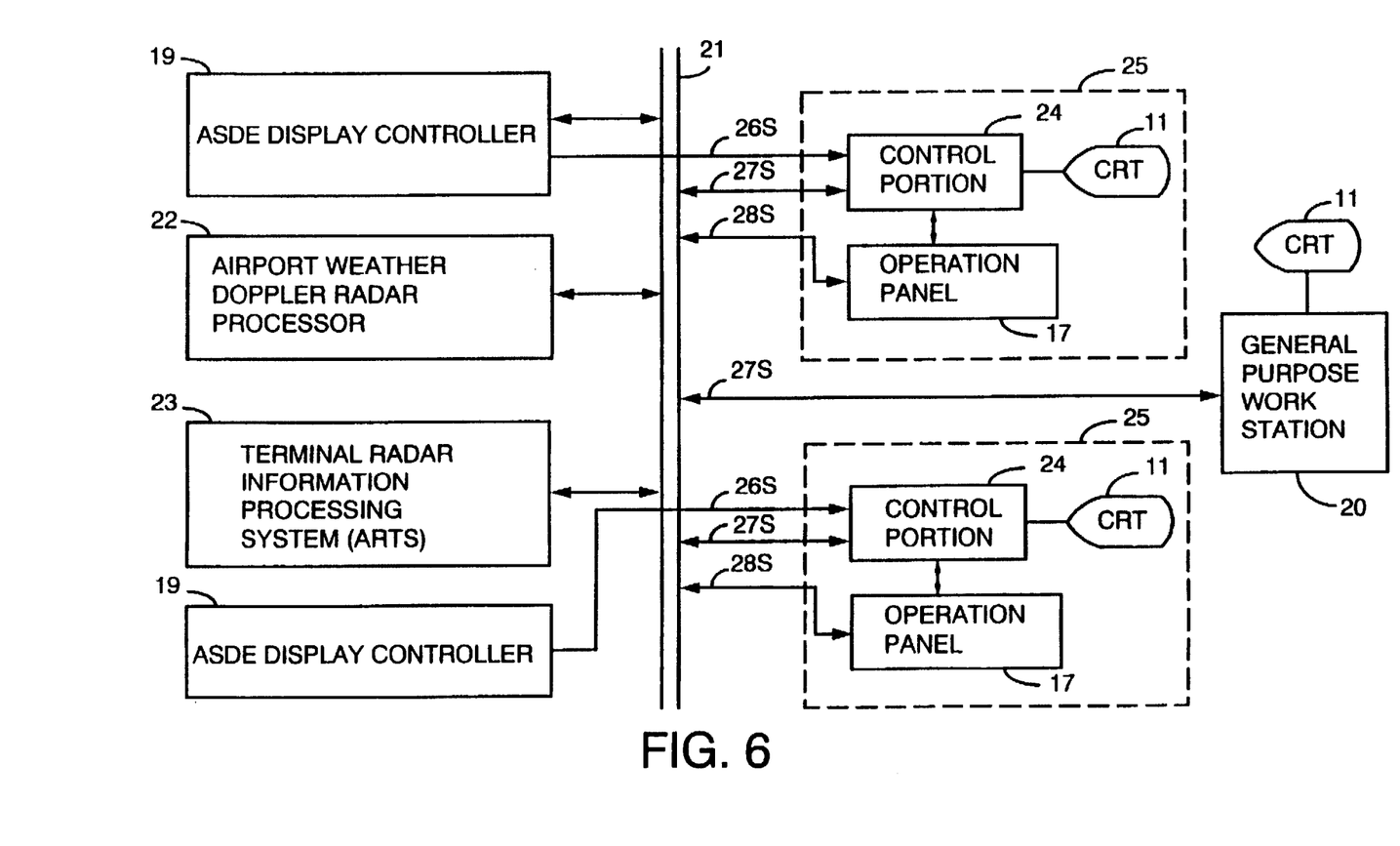
FIG. 6 is a block diagram showing a flight control display apparatus of a fourth embodiment of the present invention.

FIG. 6 is a block diagram showing an flight control in a fourth embodiment of the present invention. As shown in FIG. 6, LAN 21 is provided with terminals comprised of general-purpose work station 20 having CRT 11 in addition to the flight control display terminal 25.

The operation of the embodiment above is explained below. Television scan radar video signal 26S generated in ASDE display controller 19 is directly transmitted to the flight control display terminal 25. This television scan radar video signal 26S is displayed together with a display based on graphic display information signal 27S on CRT 11 in the flight control display terminal 25 as multi-windows display apparatus. On the other hand, the general-purpose work station 20 receives only the graphic display information signal 27S from LAN 21.

As a result, since computer graphic display can be monitored in places other than flight control center, it is possible to display the information provided from the airport weather doppler radar processor 22 or the information provided from the terminal radar data information processing system 23 by computer graphic display at various facilities in the airport such as a check-in counter or a disaster prevention center when needed. Therefore it is possible to use the information effectively.

Embodiment 5.

Figure 7:
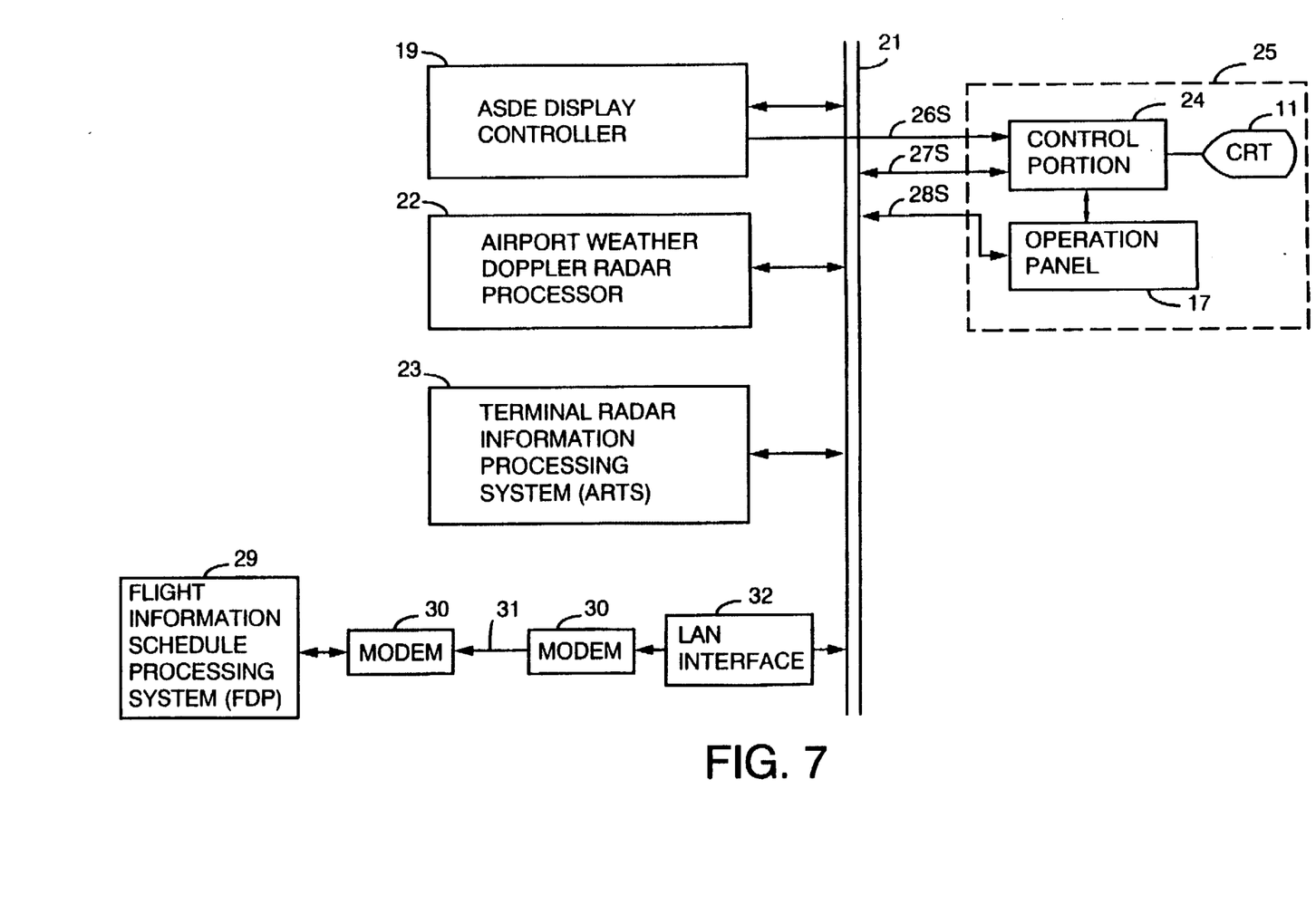
FIG. 7 is a block diagram showing a flight control display apparatus of a fifth embodiment of the present invention.

FIG. 7 is a block diagram of a display apparatus for flight control in a fifth embodiment of the present invention. As shown in FIG. 7, a flight information schedule processing system (FDP) 29 is connected to LAN 21 via an private telephone line 31. The flight information schedule processing system (FDP) 29 is connected to the modem 30 and LAN 21 is connected to a modem 30 via the LAN interface 32.

An operation for the above embodiment is explained below. The flight information schedule processing system (FDP) 29 is usually located separately from an airport and it is connected with the air traffic control system via a private telephone line 31. A modem 30 is provided at each site to connect the system through the private telephone line 31. In FIG. 7, it is also possible to use ISDN-LAN interface which uses ISDN (Integrated Services Digital Network) line instead of MODEM line.

Flight schedule data obtained by the flight information schedule processing system (FDP) 29 is transmitted to the airport via the private telephone line 31. Data received at the airport is inputted to LAN 21 via LAN interface 32. As a result, in the flight control display terminal 25, a flight schedule/paper strip is displayed as a picture on the window of CRT 11 via a graphic display information signal 27S. As a result, an approval and/or a change of flight schedule such as arrival and departure can be carried out on the operation panel 17 of the flight control display terminal 25 and they are transmitted to the flight information schedule processing system (FDP) 29 from LAN 21 via the private telephone line 31.

As explained in each embodiment, the flight control display apparatus of the present invention superposes a signal which converts an ASDE radar display into a television scan on a symbol of airplane target detected by the airport surface traffic control system and display the signal using computer graphic. Therefore, it is possible to display the flight control having improved functions.

Those skilled in the art will recognize that many modifications to the foregoing description can be made without departing from the spirit of the invention. The foregoing description is intended to be exemplary and in no way limiting. The scope of the invention is defined in the appended claims and equivalents thereto.

What is claimed is:

1. A display apparatus for flight control comprising:

scan conversion means for generating a television scan video signal according to a received radar signal including a radar video signal from ASDE (Airport Surface Detection Equipment), an ACP (Azimuth Count Pulse) signal, an ARP (Azimuth Reference Pulse) signal and a trigger signal;

a LAN (Local Area Network) interface portion which receives radar target position signals from a LAN;

computer graphic means for receiving a radar target position via said LAN interface portion and for generating a computer graphic display by adding control operation information to the radar target;

display synthesizing means which superposes said computer graphic display on said television scan video signal to develop a display picture signal; and display means which displays a picture represented by said display picture signal from said picture synthesizing means.

2. The display apparatus for flight control of claim 1 wherein said computer graphic means is constructed by a CPU portion and a panel interface portion which is controlled by an operation panel.

3. The display apparatus for flight control of claim 2 wherein the CPU portion processes an airplane symbol according to the radar target location received at the LAN interface portion, at the same time generates a map of an airport geographic outline which is stored in the memory in advance, then synthesizes the generated airplane symbol with the map of an airport building and converts them into a computer picture data.

4. The display apparatus for flight control of claim 1 wherein said computer graphic means comprises a work station.

5. The display apparatus for flight control of claim 1, further comprising:

control means which synthesizes said display picture signal received from said display synthesizing means together with various kinds of information for flight control provided via said LAN.

6. The display apparatus for flight control of claim 5, wherein said control means synthesizes a television scan radar video signal from ASDE display controller with graphic display information signal received from a source such as airport weather doppler radar processors, terminal radar data information processing systems and flight control display terminals.

7. The display apparatus for flight control of claim 6 further comprising:

operation panels which are also connected to said LAN to receive and transmit operation control signals.

8. The display apparatus for flight control of claim 5 further comprising:

work stations which are connected to said LAN to get various graphic display information signals received from a source such as airport weather doppler radar processors, terminal radar data information processing systems and flight control display terminals.

9. The display apparatus for flight control of claim 5 wherein information pertaining to flight information schedule processing system obtained via other lines is incorporated into said LAN and displayed on said display means via said control means.

10. The display apparatus for flight control of claim 9 wherein the information of the flight information schedule processing system is incorporated into said LAN via a LAN interface such as MODEM and ISDN (Integrated Services Digital Network) lines.

* * * * *